United States Patent
Roland et al.

[11] Patent Number: 5,880,053
[45] Date of Patent: Mar. 9, 1999

[54] METHOD OF PRODUCING ZEOLITE Y

[75] Inventors: Eckehart Roland, Bruchkoebel; Wolfgang Lutz, Berlin, both of Germany

[73] Assignee: Degussa Aktiengesellschaft, Frankfurt am Main, Germany

[21] Appl. No.: 704,013

[22] Filed: Aug. 26, 1996

[30] Foreign Application Priority Data

Sep. 2, 1995 [DE] Germany .......................... 19532500.1

[51] Int. Cl.$^6$ ..................................... B01J 29/08
[52] U.S. Cl. ............................. 502/79; 502/85; 423/713; 423/714
[58] Field of Search ........................ 502/85, 79; 423/713, 423/714

[56] References Cited

U.S. PATENT DOCUMENTS

| | | | |
|---|---|---|---|
| 4,840,930 | 6/1989 | LaPierre et al. | 502/79 |
| 5,534,135 | 7/1996 | Dai et al. | 208/120 |

FOREIGN PATENT DOCUMENTS

| | | |
|---|---|---|
| 0 095 305 | 5/1983 | Germany . |
| 0 295 471 | 5/1988 | Germany . |

OTHER PUBLICATIONS

Scherzer; "Dealuminated Faujasite–Type Structures with $SiO_2$ 1 $Al_2O_3$ Ratios over 100"; Journal of Catalyris: 285–288, 1978.

G. J. Ray et al., Zeolites (1988) vol. 8, pp. 458–462.

*Primary Examiner*—Michael Lewis
*Assistant Examiner*—Thomas G. Dunn, Jr.
*Attorney, Agent, or Firm*—Beveridge, DeGrandi, Weilacher & Young, LLP

[57] ABSTRACT

Y zeolites with an $SiO_2/Al_2O_3$ ratio in the framework of >100 with a high hydrothermal stability and resistance to aqueous, alkaline solutions are produced by treating a Y zeolite with a $SiO_2/Al_2O_3$ ratio between 8 and 50, partially dealuminized according to known methods from NaY zeolite by treatment with silicon tetrachloride, with water vapor at temperatures between 500° C. and 1000° C.

10 Claims, No Drawings

METHOD OF PRODUCING ZEOLITE Y

INTRODUCTION AND BACKGROUND

The present invention relates to a method of producing zeolite Y.

It is known that dealuminized Y zeolites with a ratio of $SiO_2/Al_2O_3>100$ obtained from NaY zeolite by treatment with silicon tetrachloride (DAY-S) have the advantage over aluminum-poor Y-zeolites obtained in other ways that their micropore system is largely intact. Thus, such materials have especially favorable properties for adsorption technology as regards their micropore volume and their selectivity (J. A. Martens, P. J. Grobet, P. A. Jacobs, Preparation of Catalysts V (Stud. Surf. Sci. Catal. 63), Elsevier, Amsterdam 1991, p. 355; WO 88/03437).

Y-zeolites DAY-S with high $SiO_2/Al_2O_3$ ratios of the framework, especially those with >100, have only limited stability under drastic hydrothermal conditions like those which can occur, for example, during the regeneration using water vapor in a few adsorptive and catalytic methods. In addition, they dissolve in aqueous, alkaline systems with clear losses of crystallinity. Measures were therefore developed to subsequently increase the resistance of such zeolites to water vapor and aqueous, alkaline media. For example, the building up of an aluminosilicate layer on the crystals by reacting the zeolites with a sodium aluminate solution of silicon-rich Y zeolites results in protection against water vapor (DD 296 899 and DE 42 07 815).

The prior technique has the disadvantage that the treating of very silicon-rich Y zeolites can cause damage to the crystal structure if a careful procedure is not followed on account of the pH of sodium aluminate solutions, which is in the alkaline range.

The post treatment of Y zeolites very extensively dealuminized with $SiCl_4$ (aluminum content $\leq 1.36\%$) with water vapor is known. As a result of this, amorphous silicon dioxide is either reinserted into the zeolite framework or converted into crystalline quartz (see G. J. Ray et al., ZEOLITES (1988), vol. 8, page 458 "Characterization of Defects in Deluminated Faujasite").

It is therefore an object of the present invention to produce Y zeolites with $SiO_2/Al_2O_3$ ratios in their framework of >100 which have a high hydrothermal stability and are resistant to alkaline solutions.

SUMMARY OF THE INVENTION

The above and other objects are achieved according to the present invention which pertains to a method of producing Y zeolites with an $SiO_2/Al_2O_3$ ratio of their framework of >100. The products of this process are characterized by high hydrothermal stability and resistance to aqueous, alkaline solutions. The method is carried out with a Y zeolite with $SiO_2/Al_2O_3$ between 8 and 50, preferably between 8 and 30, which has been partially dealuminized according to known methods from NaY zeolite by treatment with silicon tetrachloride. This material is then treated with water vapor at temperatures between 500° C. and 1000° C. Y zeolites DAY-ST are produced by this method which have an $SiO_2/Al_2O_3$ ratio of their framework of >100. These products are surprisingly characterized by an increased hydrothermal stability and an improved resistance to aqueous, alkaline media.

DETAILED DESCRIPTION OF THE INVENTION

In carrying out the method of this invention, it is not necessary that the $SiO_2/Al_2O_3$ ratio of the Y zeolites, which are only slightly dealuminized and obtained primarily by treating NaY zeolite with silicon tetrachloride, refers exclusively to the composition of the zeolite framework. It is rather a question of the ratio obtained by chemical analysis here. That means that this zeolite can also contain non-framework aluminum.

The water-vapor atmosphere can be adjusted by supplying water vapor. However, it can also be produced by heating a still moist zeolite to temperatures above 500° C. The partial pressure of the water vapor at the particular temperature can be between 0.1 and 1. The partial pressure of the water vapor can be adjusted by heating the moist zeolite to temperatures above 500° C.

The DAY-ST zeolites produced in accordance with the invention have the advantages of the DAY-S zeolites but have in comparison to the latter an increased stability under hydrothermal conditions and vis-à-vis aqueous, alkaline media. Their micropore volume, determined by nitrogen adsorption at 77 K according to the t-plot method, is between 0.22 and 0.25 ml/g.

The hydrothermal stability of the DAY-ST zeolites is tested by heating a suspension of 1 part zeolite in 40 parts water for 80 h in an autoclave under saturated water pressure to 160° C. Its $N_2$ sorption capacity is then determined at 77 K.

The stability in aqueous, alkaline systems is tested by stirring 1 g zeolite in 100 ml of a 0.01 molar solution of NaOH for 20 minutes and then determining the amount of dissolved $SiO_2$ in the aqueous phase.

The DAY-ST zeolites produced in accordance with the method of the invention can be used as catalysts and adsorbents.

The following examples are illustrative of the present invention.

EXAMPLE 1

1st stage: Production of a Y zeolite with an $SiO_2/Al_2O_3$ ratio of 15.2 by treating NaY zeolite with silicon tetrachloride.

300 g calcined NaY zeolite ($SiO_2/Al_2O_3=5.1$; loss on ignition at 1000° C.: 1.5% by weight) are heated in a horizontally arranged steel tube (inside diameter: 10 cm, length of the reaction zone: 80 cm) under nitrogen (10 l/h) within 1.5 h to 410° C. After a further 15 min 120 g $SiCl_4$, which are converted in an evaporator (100° C.) to the gaseous state, are conducted at this temperature of 410° C. over the zeolite for 42 min. The zeolite is then allowed to cool off within 2 h in a current of inert gas. The product is suspended in 3.0 liters of 0.1M HCl and heated for 1 h to 80° C. It is then filtered with a Buchner funnel and washed with distilled water until no more chloride ions can be demonstrated in the filtrate with $AgNO_3$. The zeolite is then dried for 16 h in a drying oven at 120° C. The product has an $SiO_2/Al_2O_3$ ratio of 15.2, determined by chemical analysis. The micropore volume, determined by nitrogen adsorption at 77 K according to the t-plot method, is 0.25 ml/g.

2nd stage: Treatment of the product of the 1st stage with water vapor in order to produce DAY-ST.

10.0 g of the product from stage 1 are tempered 3 h at 700° C. in a rotary kiln (diameter: 7 cm) in an atmosphere of water vapor. The atmosphere of water vapor is produced by evaporating 0.35 l water per hour and feeding it into the rotary kiln.

A shift of the framework sensitive vibration bands to 1078 and 836 $cm^{-1}$ can be detected thereafter in the IR spectrum. An $SiO_2/Al_2O_3$ ratio of the framework of 300 results from the position of the bands according to H. Fichtner- Schmittler, U. Lohse, H. Miessner, H. E. Maneck, Z. phys. Chem. Leipzig 271 (1990) 69. The micropore volume which can be determined by nitrogen adsorption at 77 K according to the t-plot method is 0.24 ml/g.

Testing the stability of the product of stage 2 (DAY-ST) vis-à-vis water vapor and aqueous, alkaline solutions.

A suspension of 1.0 g of the product (dry substance; taking into consideration the loss on ignition after 1 h at 1000° C.) from the second stage in 40 ml distilled water is heated for 80 h in a 60 ml autoclave to 160° C. After it cools off, the zeolite is filtered and dried for 12 h at 120° C. The specimen, which was thoroughly heated for 10 h at 400° C., takes up 139 ml/g (nitrogen under normal conditions) at 77 K and $p/p_0=0.5$.

In order to test the stability in alkaline solutions, 1.0 g (dry substance, taking into consideration the ignition loss after 1 h at 100° C.) from the second stage in 100 ml of 0.01M sodium hydroxide solution is stirred for 20 minutes. It is then filtered. The $SiO_2$ content of the filtrate is 8 mg/100 ml.

EXAMPLE 2 (REFERENCE EXAMPLE)

Synthesis of a Y zeolite with an $SiO_2/Al_2O_3$ ratio of the framework of approximately 150 by treating NaY zeolite with silicon tetrachloride (DAY-S).

300 g calcined NaY zeolite ($SiO_2/Al_2O_3$=5.1; loss on ignition at 1000° C.: 1.5% by weight) are heated in a horizontally arranged steel tube (inside diameter: 10 cm, length of the reaction zone: 80 cm) under nitrogen (10 l/h) within 1.5 h to 450° C. After a further 15 min 360 g $SiCl_4$, which are converted in an evaporator (100° C.) to the gaseous state, are conducted at this temperature of 450° C. over the zeolite for 60 min. The zeolite is then allowed to cool off within 2 h in a current of inert gas. The product is suspended in 5.0 liters of 1M HCl. This suspension is heated for 2 h under reflux. It is then filtered with a Buchner funnel and washed with distilled water until no more chloride ions can be demonstrated in the filtrate with $AgNO_3$. The zeolite is then dried for 16 h in a drying oven at 120° C. The product has an $SiO_2/Al_2O_3$ ratio of approximately 300. The micropore volume, determined by nitrogen adsorption at 77 K according to the t-plot method, is 0.27 ml/g.

Testing the stability of the DAY-S product obtained vis-à-vis water vapor and aqueous, alkaline solutions.

A suspension of 1.0 g of the zeolite obtained (dry substance, taking into consideration the loss on ignition after 1 h at 100° C.) in 40 ml distilled water is heated for 80 h in a 60 ml autoclave to 160° C. After it has cooled off the zeolite is filtered and dried for 12 h at 120° C. The specimen thoroughly heated for 10 h at 400° C. takes up only 35 ml/g (nitrogen under normal conditions) at 77 K and $p/p_0=0.5$.

This zeolite has a much smaller pore volume after the hydrothermal treatment in comparison to the material of example 1.

In order to test the stability in alkaline solutions, 1.0 g (dry substance, taking into consideration the loss on ignition after 1 h at 100° C.) from the second stage in 100 ml of a 0.01M sodium hydroxide solution is agitated for 20 minutes. It is then filtered. The $SiO_2$ content of the filtrate is 42 mg/100 ml and documents the more extensive dissolution of the zeolite in comparison to the material of example 1.

Further variations and modifications of the foregoing will be apparent to those skilled in the art and are intended to be encompassed by the claims appended hereto.

We claim:

1. A method of producing a hydrothermally stable and aqueous alkaline-resistant Y zeolite with an $SiO_2/Al_2O_3$ ratio in its framework of >100, comprising dealuminizing NaY zeolite with silicon tetrachloride to form a partially dealuminized Y zeolite having a $SiO_2/Al_2O_3$ ratio between 8 and 50, and treating aid partially dealuminized Y zeolite with water vapor at a temperature between 500° C. and 1000° C.

2. The method according to claim 1, wherein said water vapor is at a partial pressure between 0.1 and 1.

3. The method according to claim 2, wherein the partial pressure of said water vapor is adjusted by heating said Y zeolite undergoing treatment with water vapor.

4. The method according to claim 1 wherein said $SiO_2/Al_2O_3$ ratio is between 8 and 30.

5. The method of claim 1 wherein said temperature is 700° C.

6. A method of producing a hydrothermally stable and aqueous alkaline-resistant Y zeolite with an $SiO_2/Al_2O_3$ ratio in its framework of >100, consisting essentially of dealuminizing NaY zeolite with silicon tetrachloride to form a partially dealuminized Y zeolite having a $SiO_2/Al_2O_3$ ratio between 8 and 50, and treating said partially dealuminized Y zeolite with water vapor at a temperature between 500° C. and 1000° C.

7. The method according to claim 6, wherein said water vapor is at a partial pressure between 0.1 and 1.

8. The method according to claim 7, wherein the partial pressure of said water vapor is adjusted by heating said Y zeolite undergoing treatment with water vapor.

9. The method according to claim 6, wherein said $SiO_2/Al_2O_3$ ratio is between 8 and 30.

10. The method according to claim 6, wherein said temperature is 700° C.

* * * * *